June 26, 1951 E. M. ROSCHKE ET AL 2,558,390

TELEVISION RECEIVER CATHODE-RAY TUBE SYNCHRONIZING CIRCUITS

Filed June 15, 1949 3 Sheets-Sheet 1

ERWIN M. ROSCHKE
RICHARD O. GRAY
*INVENTORS*

BY Francis W. Crotty
THEIR ATTORNEY

TELEVISION RECEIVER CATHODE-RAY TUBE SYNCHRONIZING CIRCUITS

Filed June 15, 1949 3 Sheets-Sheet 2

ERWIN M. ROSCHKE
RICHARD O. GRAY
*INVENTORS*

BY Francis W. Crotty
THEIR ATTORNEY

June 26 1951 E. M. ROSCHKE ET AL 2,558,390

TELEVISION RECEIVER CATHODE-RAY TUBE SYNCHRONIZING CIRCUITS

Filed June 15, 1949 3 Sheets-Sheet 3

ERWIN M. ROSCHKE
RICHARD O. GRAY
*INVENTORS*

BY Francis W. Crotty
THEIR ATTORNEY

UNITED STATES PATENT OFFICE 2,558,390

TELEVISION RECEIVER CATHODE-RAY TUBE SYNCHRONIZING CIRCUITS

Erwin M. Roschke and Richard O. Gray, Broadview, Ill., assignors to Zenith Radio Corporation, a corporation of Illinois Application June 15, 1949, Serial No. 99,253

2 Claims. (Cl. 178—7.5)

This invention relates to television receivers of the type employing a cathode-ray tube for reproducing an image from a received television signal, and more particularly to improved synchronizing circuits for use in such receivers to cause an electron beam in the cathode-ray tube to be deflected in synchronism with the received signal.

It has been found in the development of television receiving systems that to obtain a satisfactory image on the screen of the cathode-ray tube, it is important that accurate synchronism be maintained at all times between the scanning process and the synchronizing components of the received television signals from which the image is reproduced. Accordingly, noise disturbances and other unwanted signals have an extremely detrimental effect on the scanning process, since they tend to destroy the synchronization and thus distort the reproduced image.

To overcome the deleterious effects of these noise disturbances and the like, synchronizing systems have been proposed that have some immunity to such disturbances. One type of such system has, for example, taken the form of a phase detector, a suitable filter, and a direct-current amplifier arranged to supply its output potential to a sweep generator. Synchronizing pulses from a received television signal and the output signal of the sweep generator are supplied to the phase detector, whereby variations in the output of the phase detector produced by phase changes between the synchronizing pulses and sweep signal supplied thereto impress a varying amplitude control potential on the direct-current amplifier which, in turn, controls the frequency of the sweep generator.

It is an object of the present invention to provide an improved synchronizing circuit for controlling the deflection of the electron beam in cathode-ray tubes used in television receivers.

Another object of this invention is to provide such an improved synchronizing circuit which exhibits a high degree of immunity to noise disturbances and similiar extraneous signals.

Yet another object of this invention is to provide such an improved synchronizing circuit that is extremely accurate and reliable in operation, yet uses a minimum of component parts and is, therefore, economical to construct.

The features of this invention which are believed to be new are set forth with particularlity in the appended claims. The invention itself, however, together with further objects and advantages thereof, may best be understood by reference to the following description when taken in conjunction with the accompanying drawings, in which:

Figure 1:
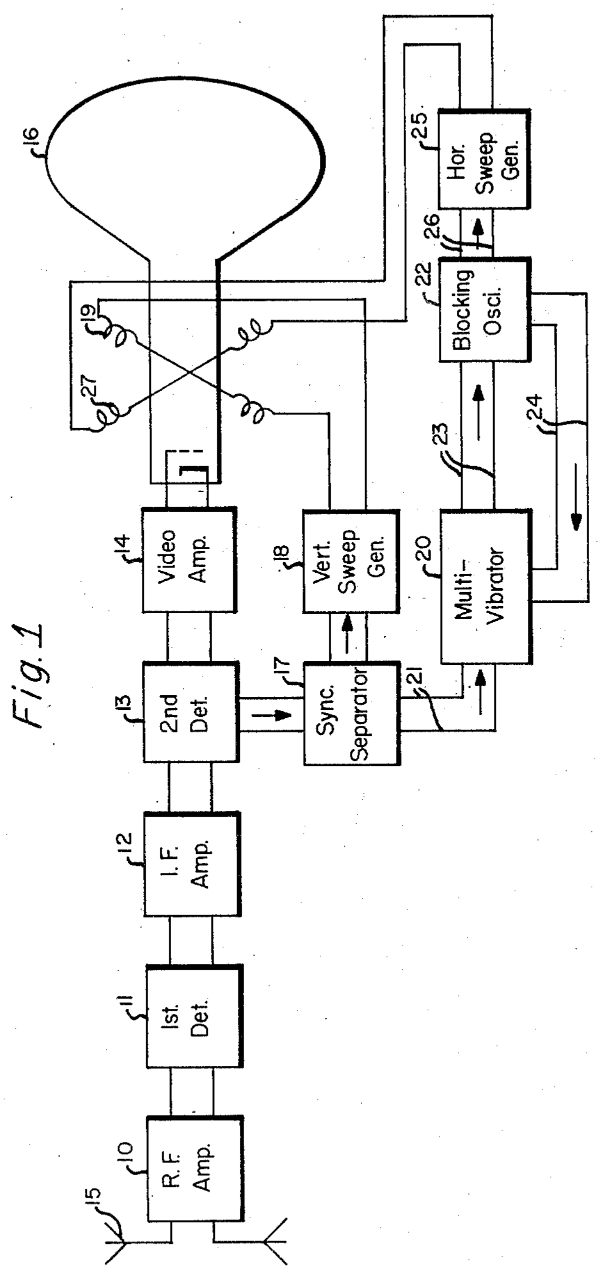
Figure 1 shows a television receiver incorporating the present invention.

Referring now to Figure 1, the television receiver illustrated therein comprises a radio-frequency amplifier 10, a first detector 11, an intermediate-frequency amplifier 12, a second detector 13, and a video amplifier 14—all these components being of conventional construction and being cascade-connected in the well-known manner to form a video translating portion of a television receiver. The output terminals of the radio-frequency amplifier 10 may be connected to a suitable antenna 15, and the output terminals of the video amplifier 14 are connected to the control electrode and cathode of a cathode-ray image-reproducing tube 16 to control the intensity of the electron beam thereof.

The output terminals of the second detector 13 are connected to a synchronizing-signal separator 17 and one pair of the terminals of the separator is connected to a vertical-sweep generator 18. The vertical-sweep generator 18 is connected to vertical beam-deflecting coils 19 of the cathode-ray tube 16 to control the vertical sweep of the electron beam in this tube. A second pair of output terminals of the synchronizing-signal separator is connected to a multivibrator circuit 20 by way of leads 21. The multivibrator circuit 20 is connected over leads 23 to a blocking oscillator 22 or similiar pulse-producing circuit, and the output signal of the blocking oscillator is fed-back to the multivibrator over the leads 24. The multivibrator 20 and the blocking oscillator 22 are employed, in accordance with the present invention, to obtain improved synchronization of the horizontal-sweep generator 25 and will be described in detail hereinafter. The output terminals of the blocking oscillator 22 are connected to a horizontal-sweep generator 25 by way of leads 26, and the generator 25 is connected to the horizontal beam-deflecting coils 27 of the cathode-ray tube 16.

The radio-frequency amplifier 10 and the first detector 11 may be tuned to amplify and heterodyne a television signal intercepted by the antenna 15 to produce an intermediate-frequency signal at the output terminals of the first detector 11. This intermediate-frequency signal is amplified in the intermediate-frequency amplifier 12, and is detected in the second detector 13. The resulting video signals from the detector 13 are amplified in the video amplifier 14 and are impressed on the input circuit of the receiver image tube 16 to control the intensity of the electron beam therein, in the well-known manner.

The synchronizing-signal components of the received television signal are removed from the video components thereof by means of the synchronizing-signal separator 17. The vertical synchronizing pulses from the separator are used to synchronize the vertical-sweep generator 18 and, hence, the vertical scanning of the device 16. The horizontal synchronizing pulses from the separator 17 are utilized, in a manner to be described presently, to synchronize the horizontal-sweep generator 25 and, hence, the horizontal scanning of the tube 16 with respect to the received signal. Having thus established synchronized vertical and horizontal scanning effects in the tube 16 and having provided for concurrent intensity modulations in the electron beam thereof in response to the received television signal, the receiver reproduces an image represented by this signal. Except for synchronization in the horizontal channel, the receiver is of conventional design, construction and operation.

Figure 2:
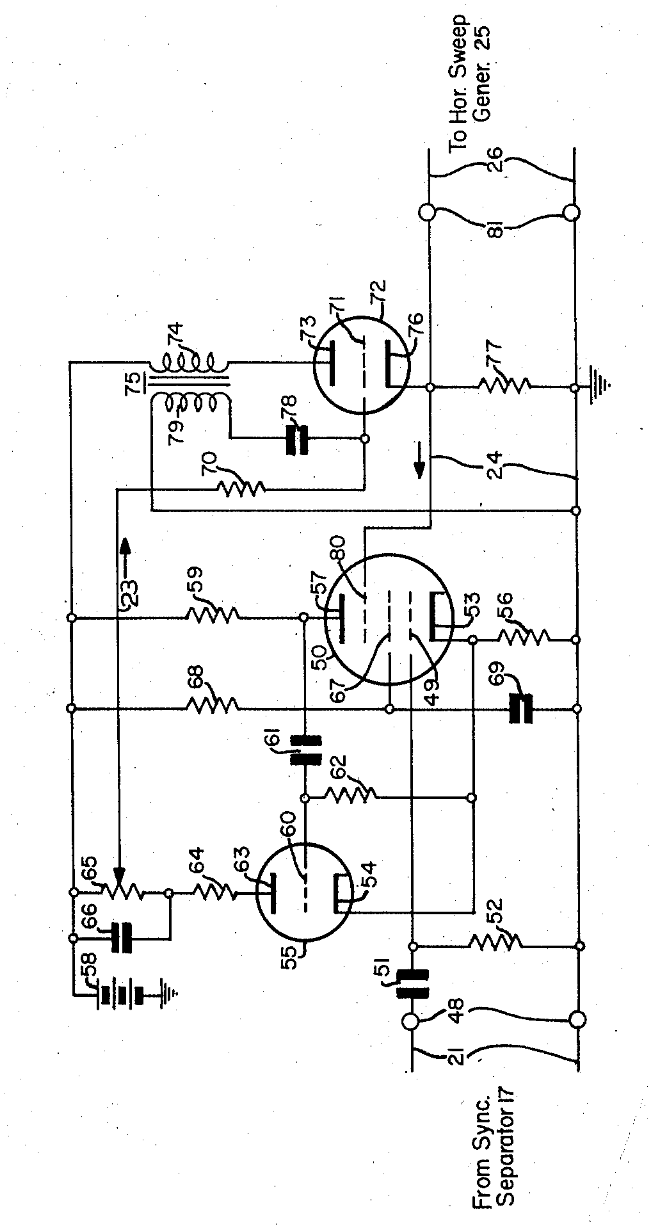
Figure 2 shows a schematic diagram of the deflection circuit used in the receiver of Figure 1 and constructed in accordance with the invention, and, Figure 3 shows various curves useful in the understanding of the invention.

Considering now more particularly the horizontal synchronizing system, reference is made to Figure 2. The multivibrator 20, indicated in block form in Figure 1, comprises a pair of input terminals 48 connected to the synchronizing-signal separator 17 by means of the leads 21. One of the terminals 48 is grounded, and the other is coupled to a control electrode 49 of an electron discharge device 50 through a capacitor 51, the control electrode being connected to ground through a resistor 52. The cathode 53 of the device 50 is directly connected to the cathode 54 of an electron discharge device 55, and these cathodes are connected to ground through a common resistor 56. The anode 57 of the device 50 is connected to the positive terminal of a source of unidirectional potential 58 through a resistor 59. Anode 57 is also coupled to the control electrode 60 of the device 55 through a capacitor 61, this control electrode being connected to cathode 54 through a grid-leak resistor 62. The anode 63 of the device 55 is connected to the positive terminal of the source 58 through a series-connected resistor 64 and potentiometer 65, the potentiometer 65 being shunted by a capacitor 66. A screen electrode 67 of the device 50 is connected to the positive terminal of the source 58 through a resistor 68, and this electrode is by-passed to ground through a capacitor 69.

A variable tap on the potentiometer 65 is connected through a resistor 70 to the control electrode 71 of an electron discharge device 72, the circuit of which forms the blocking oscillator 22, shown in block form in Figure 1. The anode 73 of the device 72 is connected to the positive terminal of the source 58 through a primary winding 74 of a transformer 75, and the cathode 76 of this device is connected to ground through a resistor 77. The control electrode 71 is coupled to ground through a capacitor 78 and the secondary winding 79 of the transformer 75. The cathode 76 is connected to a second control electrode 80 of the device 50 by means of one of the leads 24. A pair of output terminals 81 is connected across the resistor 77, and these terminals are connected to the horizontal sweep generator 25 by way of leads 26.

The capacitor 61 and resistor 62 of the multivibrator circuit formed by the devices 50 and 55 are given appropriate values so that the free-running frequency of the multivibrator is slightly below the repetition frequency of the horizontal synchronizing pulses. Similarly, the blocking oscillator circuit formed by the device 72 is adjusted to have a free-running frequency slightly below this repetition frequecy, and also to generate pulses having individual durations longer than the durations of the horizontal synchronizing pulses. The horizontal synchronizing pulses from the separator 17 are impressed on the multivibrator circuit over the leads 21 connected to the terminals 48. The output pulses of the blocking oscillator which appear across the resistor 77 are also impressed on the multivibrator circuit by way of the leads 24. The multivibrator circuit is triggered, in a manner to be described, by the coincidence of a horizontal synchronizing pulse on the control electrode 49 and a blocking oscillator pulse on the control electrode 80. In response to each joint application of these pulses, an output pulse appears in the anode circuit of the device 55. These output pulses are filtered in the filter network formed by the resistor 65 and the capacitor 66, and form a bias control for the discharge device 72. It is well known that the frequency of a blocking oscillator is determined by the direct-current bias on the control electrode of its discharge device. In the present circuit the bias on the control electrode 71, and hence the frequency of the blocking oscillator, is determined by the control potential developed by the filter 65—66. The output of the blocking oscillator appears across the terminals 81 and is supplied to the horizontal-sweep generator 25 to synchronize this generator.

The multivibrator circuit is arranged so that in its initial state the device 50 is non-conductive and the device 55 is highly conductive. Positive-polarity pulses from the blocking oscillator circuit are impressed on the control electrode 80 of the device 50, but the circuit is so arranged that these pulses have insufficient amplitude to cause this device to become conductive and trip the multivibrator. However, positive-polarity horizontal synchronizing pulses are impressed on the control electrode 49 of the device 50, and when one of these synchronizing pulses occurs in coincidence with one of the blocking oscillator pulses, the combined amplitude of the two pulses is sufficient to trip the multivibrator from its initial to a secondary state, and the multivibrator is so tripped by the leading edge of the synchronizing pulse. In this secondary state the device 50 becomes highly conductive and device 55 is rendered nonconductive. The multivibrator remains in this secondary state after the trailing edge of the synchronizing pulse portion of the combined triggering pulse since the resulting decrease in space current through the device 50 is insufficient to return the multivibrator to its initial state. However, at the trailing edge of the associated blocking-oscillator pulse, the decrease in space current through device 50 is sufficient to return the multivibrator to its initial stage. Therefore, an output pulse appears in the anode circuit of the device 55 in response to each combined synchronizing and blocking oscillator pulse. Since the leading edge of this output pulse is determined by the leading edge of the synchronizing pulse and the trailing edge of this pulse is determined by the trailing edge of the blocking oscillator pulse associated with the synchronizing pulse, the duration of the output pulse is dependent upon the phase relation of the synchronizing pulse and its associated blocking oscillator pulse. In this manner pulses are produced in the anode circuit of the device 55 which have a duration determined by the instantaneous phase relation between the horizontal synchronizing pulses impressed across the terminals 48 and the blocking oscillator pulses supplied to the multivibrator over the leads 24.

The pulses produced in the anode circuit of the device 55 are impressed across the filter network 65—66 and a control potential is derived across the resistor 65 having an average value depending upon the duration of the individual ones of these pulses. This control potential is supplied to the control electrode 71 of the discharge device 72 and, in the previously described manner, controls the frequency of the blocking oscillator. Should the blocking oscillator frequency tend to increase, the blocking oscillator pulses supplied to the device 50 would tend to change their phase relationship with the horizontal synchronizing pulses applied thereto in a direction to decrease the individual duration of the pulses in the anode circuit of the device 55. This decrease in the individual duration of the anode circuit pulses would tend to decrease the control potential developed across the filter network 65—66 which, in turn, would tend to decrease the frequency of the blocking oscillator and, hence, compensate for the tendency of the blocking oscillator to increase in frequency. Similarly, should the frequency of the blocking oscillator tend to decrease, the control potential developed across the filter 65—66 would tend to increase and hence compensate for this tendency of the oscillator frequency. The value of the control potential supplied to the blocking oscillator may also be varied by adjustment of the tap on potentiometer 65. By adjusting this tap, the frequency of the blocking oscillator may be varied until it is substantially that of the horizontal synchronizing pulses, at which time the horizontal synchronizing pulses and the blocking oscillator pulses each occur in time coincidence and the multivibrator circuit is actuated to maintain a desired relationship between the blocking oscillator pulses and the horizontal synchronizing pulses.

The filter network 65—66 is arranged so that the potential change across the resistor 65 is extremely slow for the "no pulse" condition in the anode circuit of the device 55. Therefore, during short intervals when the synchronizing pulses are lost in background noise, the change in control potential across resistor 65 and the frequency of the blocking oscillator is not altered to any appreciable extent.

Figure 3:
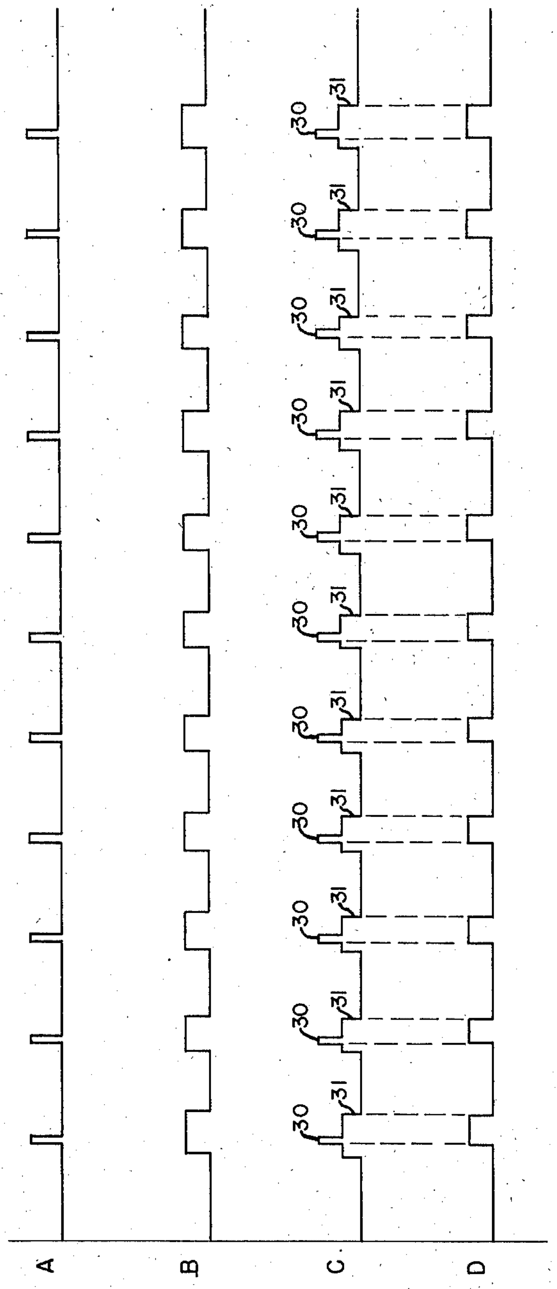

Reference is not made to Figure 3 for a clearer understanding of the operation of the horizontal-deflection circuit of the present invention. The horizontal-synchronizing pulses from the separator 17 are shown in the curve 3A, these pulses are supplied over the leads 21 to the multivibrator 20. As previously stated, the blocking oscillator is adjusted to have a free-running frequency slightly below the repetition frequency of the horizontal-synchronizing pulses and to generate pulses of greater time durations than the durations of the horizontal synchronizing pulses. These pulses from the blocking oscillator are shown in the curve 3B, and are supplied over the leads 24 to the device 50 of the multivibrator circuit. The pulses represented in curves 3A and 3B are effectively added in the multivibrator 20 to produce a resulting signal shown in the curve 3C. As previously described, the multivibrator is tripped from an initial to a secondary state by the leading edge of a synchronizing pulse 30, and is returned to its initial state by the trailing edge of the blocking oscillator pulse 31 associated with the synchronizing pulse. Therefore, the multivibrator acts as a pulse phase-detector circuit, and pulses shown in curve 3D are obtained at the output of the multivibrator, these pulses having durations that are determined by the relative phase of the pulses 30 with respect to the pulses 31. The pulses of curve 3D are passed through the filter network 65—66 to obtain a control potential for the blocking oscillator 22 which varies the frequency thereof in a direction to compensate for changes in phase of the pulses 30—31. Any tendency of the blocking oscillator to drift away from its controlled frequency causes an alteration in the duration of the pulses of curve 3D to change the bias on the blocking oscillator in a direction to compensate for such drifting.

The separator 17 preferably is of the well-known type in which noise pulses are clipped so as to have a maximum amplitude substantially that of the synchronizing pulses. The blocking oscillator is adjusted so that the pulses 31 have an amplitude substantially equal to the clipped maximum value of these noise pulses. Since the multivibrator is responsive only to the combined amplitudes of a synchronizing pulse 30 and a blocking oscillator pulse 31, these clipped noise pulses have little effect on the synchronization of the blocking oscillator and the horizontal sweep generator 25.

It is conceivable that occasionally noise pulses may occur in the interval between the leading edge of a pulse 31 and the leading edge of an associated pulse 30 and thus appear mounted on the pulse 31 and trip the multivibrator. However, the effect of such a pulse is to change the bias slightly on the blocking oscillator and cause it to drift gradually in a direction to move the pulses 31 slightly to the right in the drawing, relative to the pulses 30. The blocking oscillator would then drift gradually in a direction to move the pulses 31 back to their original position relative to the pulses 30. However, should the noise pulse recur, the gradual drift of the pulses 31 to the right would in effect cause the pulses 30 to crowd the noise pulse off the pulse 31 as the leading edges of the pulses 30 approach the leading edges of the pulses 31. The drifting of the blocking oscillator 20 is so slight and so gradual in the presence of noise signals that no discernable distortion is produced thereby in the reproduced image.

This invention provides, therefore, a deflection circuit for synchronizing the deflection of a cathode ray tube in a television receiver with a received television signal, which circuit exhibits a high degree of immunity to noise disturbances and the like. Moreover, this circuit uses a minimum of component parts and yet is extremely efficient and accurate in operation.

While a particular embodiment of the invention has been shown and described, modifications may be made and it is intended in the appended claims to cover all such modifications as fall within the true spirit and scope of the invention.

We claim:

1. A receiver for utilizing a composite television signal including synchronizing components comprising: a cathode-ray device having beam-deflection elements for deflecting a cathode-ray beam; a synchronizing-signal separator for separating said synchronizing components and for limiting their amplitude to a predetermined level; a sweep generator for supplying a deflection signal to said deflection elements; a pulse generator coupled to said sweep generator for generating periodic driving pulses therefor having a duration long with respect to said synchronizing components but with a repetition frequency corresponding to the repetition frequency of said synchronizing components; a trigger circuit including a pair of cross-coupled discharge devices normally maintained in one stable operating condition, subject to be triggered to an alternative operating condition by an applied signal having an amplitude exceeding said predetermined level and subject to be returned to said one condition in response to an amplitude excursion of said applied signal below said predetermined level; means for effectively individually superposing said synchronizing components on said driving pulses and for applying the superposed pulses to said trigger circuit; an integrating circuit included in said trigger circuit for developing a unidirectional control potential representing the phase relation of the superposed pulses; and means for applying said control potential to said pulse generator to control the operating frequency thereof to tend to maintain a fixed phase relation between said synchronizing components and said driving pulses.

2. A receiver for utilizing a composite television signal including substantially rectangular synchronizing components comprising: a cathode-ray device having beam-deflection elements for deflecting a cathode-ray beam; a synchronizing-signal separator for separating said synchronizing components and for limiting their amplitude to a predetermined level; a sweep generator for supplying a deflection signal to said deflection elements; a pulse generator coupled to said sweep generator for generating substantially rectangular periodic driving pulses therefor having a duration long with respect to said synchronizing components but with a repetition frequency and amplitude corresponding to the repetition frequency and amplitude of said synchronizing components; a trigger circuit including a pair of cross-coupled discharge devices normally maintained in one stable operating condition, subject to be triggered to an alternative operating condition by an applied signal having an amplitude exceeding said predetermined level and subject to be returned to said one condition in response to an amplitude excursion of said applied signal below said predetermined level; means for effectively individually superposing said synchronizing components on said driving pulses and for applying the superposed pulses to said trigger circuit; an integrating circuit included in said trigger circuit for developing a unidirectional control potential representing the phase relation of the superposed pulses; and means for applying said control potential to said pulse generator to control the operating frequency thereof to tend to maintain a fixed phase relation between said synchronizing components and said driving pulses.

ERWIN O. ROSCHKE.
RICHARD O. GRAY.

REFERENCES CITED

The following references are of record in the file of this patent:

UNITED STATES PATENTS

| Number | Name | Date |
|---|---|---|
| 2,491,804 | Fleming et al. | Dec. 20, 1949 |

FOREIGN PATENTS

| Number | Country | Date |
|---|---|---|
| 847,675 | France | Oct. 13, 1939 |